US012618421B2

(12) United States Patent
Nose et al.

(10) Patent No.: US 12,618,421 B2
(45) Date of Patent: May 5, 2026

(54) HYDRAULIC DRIVE SYSTEM

(71) Applicant: KAWASAKI JUKOGYO KABUSHIKI KAISHA, Kobe (JP)

(72) Inventors: Tomomichi Nose, Kobe (JP); Hayato Kawasaki, Kobe (JP); Hideyasu Muraoka, Kobe (JP); Nobuyuki Kinoshita, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/983,883

(22) Filed: Dec. 17, 2024

(65) Prior Publication Data

US 2025/0116280 A1 Apr. 10, 2025

Related U.S. Application Data

(62) Division of application No. 18/001,650, filed as application No. PCT/JP2021/016850 on Apr. 27, 2021, now Pat. No. 12,352,293.

(30) Foreign Application Priority Data

Jun. 19, 2020 (JP) ................................ 2020-106204

(51) Int. Cl.
*F15B 11/042* (2006.01)
*E02F 9/22* (2006.01)
(Continued)

(52) U.S. Cl.
CPC .......... *F15B 11/042* (2013.01); *E02F 9/2217* (2013.01); *E02F 9/2228* (2013.01); *E02F 9/2296* (2013.01); *F15B 11/024* (2013.01); *F15B 11/044* (2013.01); *F15B 2011/0246* (2013.01); *F15B 2211/20523* (2013.01);
(Continued)

(58) Field of Classification Search
CPC ..... F15B 11/042; F15B 11/024; F15B 11/044; F15B 2211/0246; F15B 2211/20523; F15B 2211/20546; F15B 2211/30565; F15B 2211/3058; F15B 2211/327; F15B 2211/351; F15B 2211/353; F15B 2211/426; F15B 2211/455; F15B 2211/46; F15B 2211/6309; F15B 2211/6313; F15B 2211/6346; F15B 2211/6654;
(Continued)

(56) References Cited

U.S. PATENT DOCUMENTS 5,138,838 A * 8/1992 Crosser ................. F15B 21/087 91/463
8,635,939 B2 * 1/2014 Linjama .................. F04B 49/03 91/465
(Continued)

*Primary Examiner* — Dustin T Nguyen
(74) *Attorney, Agent, or Firm* — Alleman Hall LLP

(57) ABSTRACT

This hydraulic drive system includes: a hydraulic pump that supplies a working fluid to a hydraulic actuator; a meter-in control valve that controls a flow rate of the working fluid flowing from the hydraulic pump to the hydraulic actuator; a meter-out control valve that controls a flow rate of the working fluid being drained from the hydraulic actuator into a tank; and a regeneration valve that supplies, to the hydraulic actuator, the working fluid drained from the hydraulic actuator. The meter-out control valve is connected to the hydraulic actuator in parallel with the regeneration valve.

6 Claims, 4 Drawing Sheets

(51) Int. Cl.
*F15B 11/024* (2006.01)
*F15B 11/044* (2006.01)

(52) U.S. Cl.
CPC ............... *F15B 2211/20546* (2013.01); *F15B 2211/30565* (2013.01); *F15B 2211/3058* (2013.01); *F15B 2211/327* (2013.01); *F15B 2211/351* (2013.01); *F15B 2211/353* (2013.01); *F15B 2211/426* (2013.01); *F15B 2211/455* (2013.01); *F15B 2211/46* (2013.01); *F15B 2211/6309* (2013.01); *F15B 2211/6313* (2013.01); *F15B 2211/6346* (2013.01); *F15B 2211/6654* (2013.01)

(58) Field of Classification Search
CPC .......... F15B 2211/30575; E02F 9/2217; E02F 9/2228; E02F 9/2296
See application file for complete search history.

(56) References Cited

U.S. PATENT DOCUMENTS 9,359,743 B2 * 6/2016 Kawasaki ............. E02F 9/2278
10,227,997 B2 * 3/2019 Hijikata ................ E02F 9/2203
10,337,532 B2 * 7/2019 Ma ...................... F15B 13/0442
10,408,238 B2 * 9/2019 Wang .................... F15B 19/002
10,526,767 B2 * 1/2020 Hijikata ................ E02F 9/2282
11,105,347 B2 * 8/2021 Rannow ................ E02F 9/2203
2004/0011192 A1 * 1/2004 Frediani ................ F15B 11/044
91/465

* cited by examiner

HYDRAULIC DRIVE SYSTEM

CROSS-REFERENCE TO RELATED APPLICATION(S)

The present application is a divisional of U.S. patent application Ser. No. 18/001,650, filed Dec. 13, 2022, and entitled HYDRAULIC DRIVE SYSTEM, which is a national stage of the international application PCT/JP2021/016850, filed on Apr. 27, 2021, which in turn claims priority to Japanese Patent Application No. 2020-106204, filed on Jun. 19, 2020, the entire disclosures of each of which are hereby incorporated herein by reference for all purposes.

TECHNICAL FIELD

The present invention relates to a hydraulic drive system capable of regenerating a working fluid drained from a hydraulic actuator.

BACKGROUND ART

In a hydraulic drive system, a working fluid drained from a hydraulic actuator is regenerated in order to obtain energy-saving effects. Known examples of this hydraulic drive system include the hydraulic drive device disclosed in Japanese Laid-Open Patent Application Publication (PTL) 1.

CITATION LIST

Patent Literature

PTL 1: Japanese Laid-Open Patent Application Publication No. 2018-028358

SUMMARY OF INVENTION

Technical Problem

In the hydraulic drive system disclosed in PTL 1, a working fluid drained to a meter-out line is regenerated to a hydraulic cylinder via a regeneration line. Therefore, the working fluid drained to the meter-out line is directly regenerated to the hydraulic cylinder, causing a change in a regeneration flow rate depending on, for example, a load and an attitude of an attachment attached to the hydraulic cylinder. In this case, the load and the attitude of the attachment have impact on the responsiveness of the cylinder to lever operation. Furthermore, at the time of draining the working fluid to a tank during regeneration, the working fluid is routed to the tank through a control valve and a regeneration release valve. Therefore, the pressure loss in the working fluid during the regeneration is great.

Thus, an object of the present invention is to provide a hydraulic drive system capable of reducing the impact of variations in a regeneration flow rate on the responsiveness of a hydraulic actuator.

Furthermore, according to the present invention, it is possible to provide a hydraulic drive system capable of reducing a pressure loss in a working fluid that occurs during regeneration.

Solution to Problem

A hydraulic drive system according to the present invention includes: a hydraulic pump that supplies a working fluid to a hydraulic actuator; a meter-in control valve that controls a flow rate of the working fluid flowing from the hydraulic pump to the hydraulic actuator; a meter-out control valve that controls a flow rate of the working fluid being drained from the hydraulic actuator into a tank; and a regeneration valve that supplies, to the hydraulic actuator, the working fluid drained from the hydraulic actuator. The meter-out control valve is connected to the hydraulic actuator in parallel with the regeneration valve.

According to the present invention, at each of the meter-in control valve, the meter-out control valve, and the regeneration valve, the flow rate of the working fluid flowing therethrough can be controlled independently. Thus, the meter-out flow rate can be adjusted in line with variations in the regeneration flow rate. Thus, it is possible to reduce the impact of variations in the regeneration flow rate on the responsiveness of the hydraulic actuator.

Furthermore, according to the present invention, the working fluid to be drained into the tank is drained from the hydraulic actuator into the tank without passing through the regeneration valve. Therefore, it is possible to reduce the pressure loss in the working fluid that is drained into the tank.

Advantageous Effects of Invention

According to the present invention, it is possible to reduce the impact of variations in the regeneration flow rate on the responsiveness of the hydraulic actuator.

Furthermore, according to the present invention, it is possible to reduce the pressure loss in the working fluid that occurs during the regeneration.

The above object, other objects, features, and advantages of the present invention will be made clear by the following detailed explanation of preferred embodiments with reference to the attached drawings.

DESCRIPTION OF EMBODIMENTS

Hereinafter, a hydraulic drive system 1 according to an embodiment of the present invention will be described with reference to the aforementioned drawings. Note that the concept of directions mentioned in the following description is used for the sake of explanation; the orientations, etc., of elements according to the invention are not limited to these directions. The hydraulic drive system 1 described below is merely one embodiment of the present invention. Thus, the present invention is not limited to the embodiment and may be subject to addition, deletion, and alteration within the scope of the essence of the invention.

Hydraulically driven equipment such as construction equipment, industrial equipment, and industrial vehicles includes a hydraulic actuator and the hydraulic drive system

Figure 1:
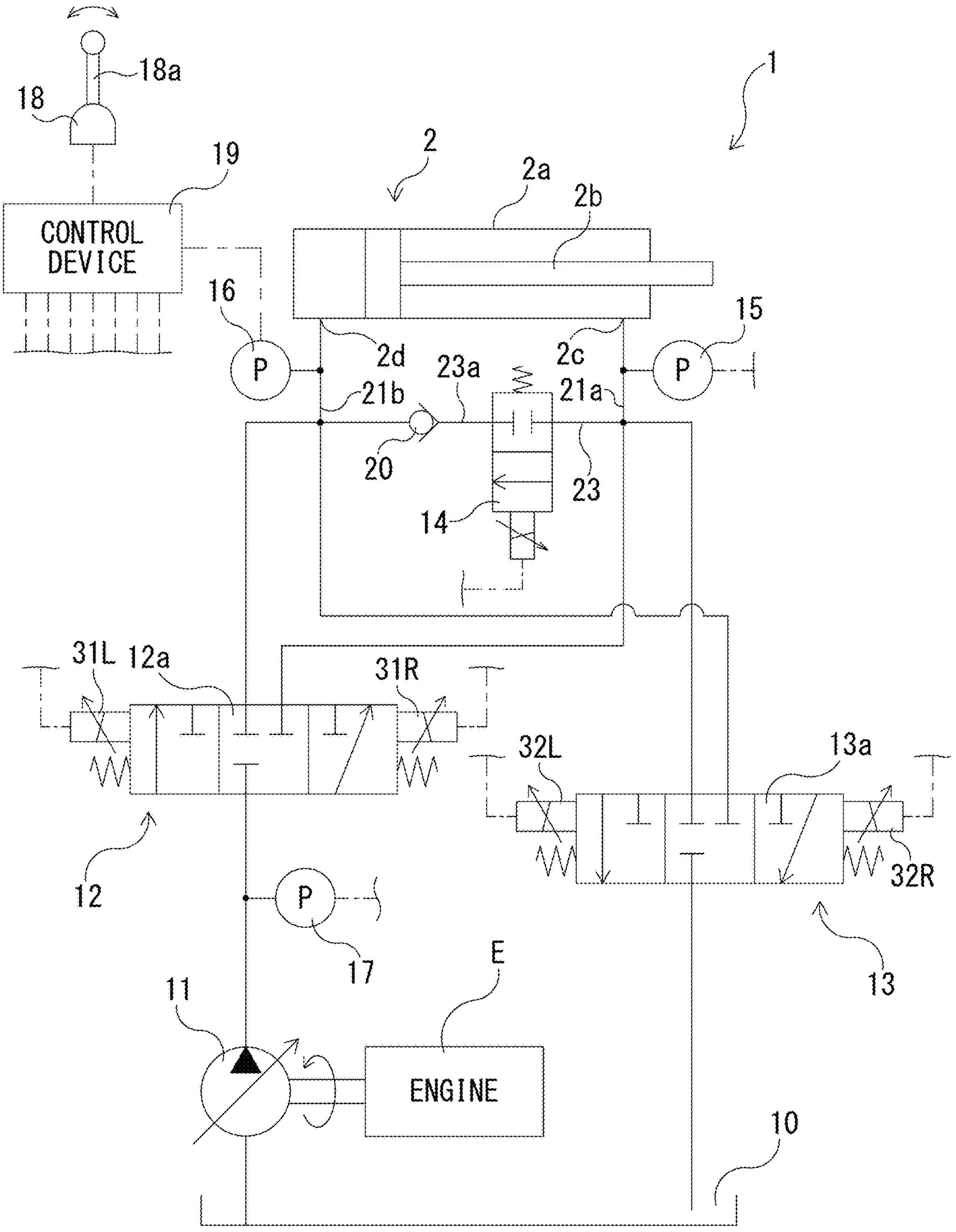
FIG. 1 is a hydraulic circuit diagram showing a hydraulic drive system according to an embodiment of the present invention.

1. The hydraulically driven equipment is capable of moving various elements by actuating the hydraulic actuator. Thus, the hydraulically driven equipment is capable of performing various tasks. The hydraulic actuator is, for example, a hydraulic cylinder 2 such as that illustrated in FIG. 1. The hydraulic cylinder 2 can expand and contract to move various elements. More specifically, in the hydraulic cylinder 2, a rod 2*b* is inserted into a cylinder tube 2*a* so as to be able to move back and forth. Furthermore, a rod-end port 2*c* and a head-end port 2*d* are formed on the cylinder tube 2*a*. When a working fluid is supplied to and drained from the ports 2*c*, 2*d*, the rod 2*b* moves back and forth with respect to the cylinder tube 2*a*, in other words, the hydraulic cylinder 2 expands and contracts.

The hydraulic drive system 1 supplies and drains the working fluid to and from the hydraulic cylinder 2. In other words, the hydraulic drive system 1 is connected to the ports 2*c*, 2*d* of the hydraulic cylinder 2. When the working fluid is supplied to the rod-end port 2*c* of the hydraulic cylinder 2 and the working fluid is drained from the head-end port 2*d*, the hydraulic cylinder 2 is retracted. Furthermore, in the hydraulic drive system 1, when the working fluid is supplied to the head-end port 2*d* of the hydraulic cylinder 2 and the working fluid is drained from the rod-end port 2*c*, the hydraulic cylinder 2 is extended. More specifically, the hydraulic drive system 1 includes a hydraulic pump 11, a meter-in control valve 12, a meter-out control valve 13, a regeneration valve 14, three pressure sensors 15 to 17, an operation device 18, and a control device 19, for example.

The hydraulic pump 11 is rotationally driven to discharge the working fluid. This means that the hydraulic pump 11 is connected to a drive source. The drive source is an engine E or an electric motor. Note that in the present embodiment, the drive source is the engine E. The hydraulic pump 11 is rotationally driven by the engine E to discharge the working fluid. In the present embodiment, the hydraulic pump 11 is a swash plate pump or an axial piston pump.

The meter-in control valve 12 is located between the hydraulic pump 11 and the hydraulic cylinder 2. Specifically, the meter-in control valve 12 is connected to the hydraulic pump 11 and the ports 2*c*, 2*d* of the hydraulic cylinder 2. In the present embodiment, the meter-in control valve 12 is connected to the rod-end port 2*c* through a rod-end passage 21*a* and is connected to the head-end port 2*d* through a head-end passage 21*b*. Furthermore, the meter-in control valve 12 can control, according to a meter-in command that is input thereto, the direction and the flow rate of the working fluid that is supplied from the hydraulic pump 11 to the hydraulic cylinder 2. In other words, the meter-in control valve 12 can supply the working fluid from the hydraulic pump 11 to one of the ports 2*c*, 2*d* of the hydraulic cylinder 2 and control a meter-in flow rate which is the flow rate of the working fluid being supplied. Specifically, in the present embodiment, the meter-in control valve 12 is an electronically controlled spool valve. More specifically, the meter-in control valve 12 includes a spool 12*a* and two electromagnetic proportional control valves 31L, 31R. The spool 12*a* can switch the flow direction of the working fluid by moving, and can further control the opening degree of the meter-in control valve 12.

The two electromagnetic proportional control valves 31L, 31R can apply pilot pressures directed opposite to each other to the spool 12*a*. The two electromagnetic proportional control valves 31L, 31R output pilot pressures corresponding to a meter-in command that is input thereto, and move spool 12*a* to a position corresponding to the difference between the two pilot pressures. In other words, the two electromagnetic proportional control valves 31L, 31R move the spool 12*a* to a position corresponding to the meter-in command that is input to the two electromagnetic proportional control valves 31L, 31R. Accordingly, the working fluid is supplied to the hydraulic cylinder 2 at a meter-in flow rate in a direction corresponding to the input meter-in command.

The meter-out control valve 13 is located between the hydraulic pump 11 and the tank 10. Specifically, the meter-out control valve 13 is connected to the ports 2*c*, 2*d* of the hydraulic cylinder 2 and the tank 10. In the present embodiment, the meter-out control valve 13 is connected to each of the rod-end passage 21*a* and the head-end passage 21*b* in parallel with the meter-in control valve 12. The meter-out control valve 13 can control, according to a meter-out command that is input thereto, the direction and the flow rate (meter-out flow rate) of the working fluid being drained from the hydraulic cylinder 2 into the tank 10. Specifically, the meter-out control valve 13 can switch the direction of the working fluid being drained, to one of the directions from the ports 2*c*, 2*d* of the hydraulic cylinder 2 to the tank 10, and control the meter-out flow rate. Note that the meter-out control valve 13 can control the flow rate of the working fluid flowing through the meter-out control valve 13, independently of the flow rate of the working fluid being supplied to the hydraulic cylinder 2 via the meter-in control valve 12. Specifically, in the present embodiment, the meter-out control valve 13 is an electronically controlled spool valve. More specifically, the meter-out control valve 13 includes a spool 13*a* and two electromagnetic proportional control valves 32L, 32R. The spool 13*a* can switch the flow direction of the working fluid by moving, and can further control the opening degree of the meter-out control valve 13.

The two electromagnetic proportional control valves 32L, 32R can apply pilot pressures directed opposite to each other to the spool 13*a*. The two electromagnetic proportional control valves 32L, 32R output pilot pressures corresponding to a meter-out command that is input thereto, and move spool 13*a* to a position corresponding to the difference between the two pilot pressures. In other words, the two electromagnetic proportional control valves 32L, 32R move the spool 13*a* to a position corresponding to the meter-out command that is input to the two electromagnetic proportional control valves 32L, 32R. Accordingly, the working fluid is drained from the hydraulic cylinder 2 in a direction corresponding to the input meter-out command at a flow rate corresponding to the input meter-out command.

The regeneration valve 14 is connected to the hydraulic cylinder 2 in parallel with the meter-out control valve 13. The regeneration valve 14 regenerates, to the hydraulic cylinder 2, the working fluid drained from the hydraulic cylinder 2. In the present embodiment, the regeneration valve 14 is located in a regeneration passage 23 connecting the rod-end passage 21*a* and the head-end passage 21*b*. More specifically, the regeneration valve 14 is capable of opening and closing the regeneration passage 23 according to a regeneration valve command that is input to the regeneration valve 14. A check valve 20 is located in the regeneration passage 23. In the present embodiment, the check valve 20 is located in the regeneration passage 23, on the head-end passage 21*b* side relative to the regeneration valve 14. The check valve 20 allows the working fluid to flow forward in the regeneration passage 23 from the rod-end port 2*c* to the head-end port 2*d*, and blocks the opposite flow of the working fluid. Therefore, the hydraulic drive system 1 can regenerate the working fluid from the rod-end port 2*c* to the head-end port 2*d*. Furthermore, the regeneration valve 14 can adjust the opening degree according to the regeneration valve command that is input thereto. Thus, the regeneration valve 14 can regenerate the working fluid to the hydraulic cylinder 2 at a regeneration flow rate corresponding to the regeneration valve command that is input to the regeneration valve 14. Note that the regeneration valve 14 can control the flow rate of the working fluid flowing through the regeneration valve 14, independently of the flow rate of the working fluid flowing through each of the meter-in control valve 12 and the meter-out control valve 13. In the present embodiment, the regeneration valve 14 is an electromagnetic proportional control valve.

The first and second pressure sensors 15, 16 measure hydraulic pressures of the working fluid that is supplied and drained to and from the rod-end port 2*c* and the head-end port 2*d*. More specifically, the first pressure sensor 15 is connected to the rod-end passage 21*a*. This means that the first pressure sensor 15 measures the hydraulic pressure (rod pressure Pcr) of the working fluid that is supplied to and from the rod-end port 2*c*. On the other hand, the second pressure sensor 16 is connected to the head-end passage 21*b*. This means that the second pressure sensor 16 measures the hydraulic pressure (head pressure Pch) of the working fluid that is supplied to and from the head-end port 2*d*. The third pressure sensor 17 measures the hydraulic pressure (discharge pressure) of the working fluid that is discharged from the hydraulic pump 11. The three pressure sensors 15 to 17 output the measured hydraulic pressures to the control device 19.

The operation device 18 outputs an operation command to the control device 19 in order to actuate the hydraulic cylinder 2. The operation device 18 is an operation valve or an electric joystick, for example. More specifically, the operation device 18 includes an operation lever 18*a* which is one example of the operation tool. The operation lever 18*a* is configured in such a manner that an operator can operate the operation lever 18*a*. The operation device 18 outputs an operation command corresponding to the amount of operation of the operation lever 18*a* to the control device 19. In the present embodiment, the operation lever 18*a* is configured so as to be able to swing. The operation device 18 outputs an operation command corresponding to the amount of swing of the operation lever 18*a* to the control device 19.

Figure 2:
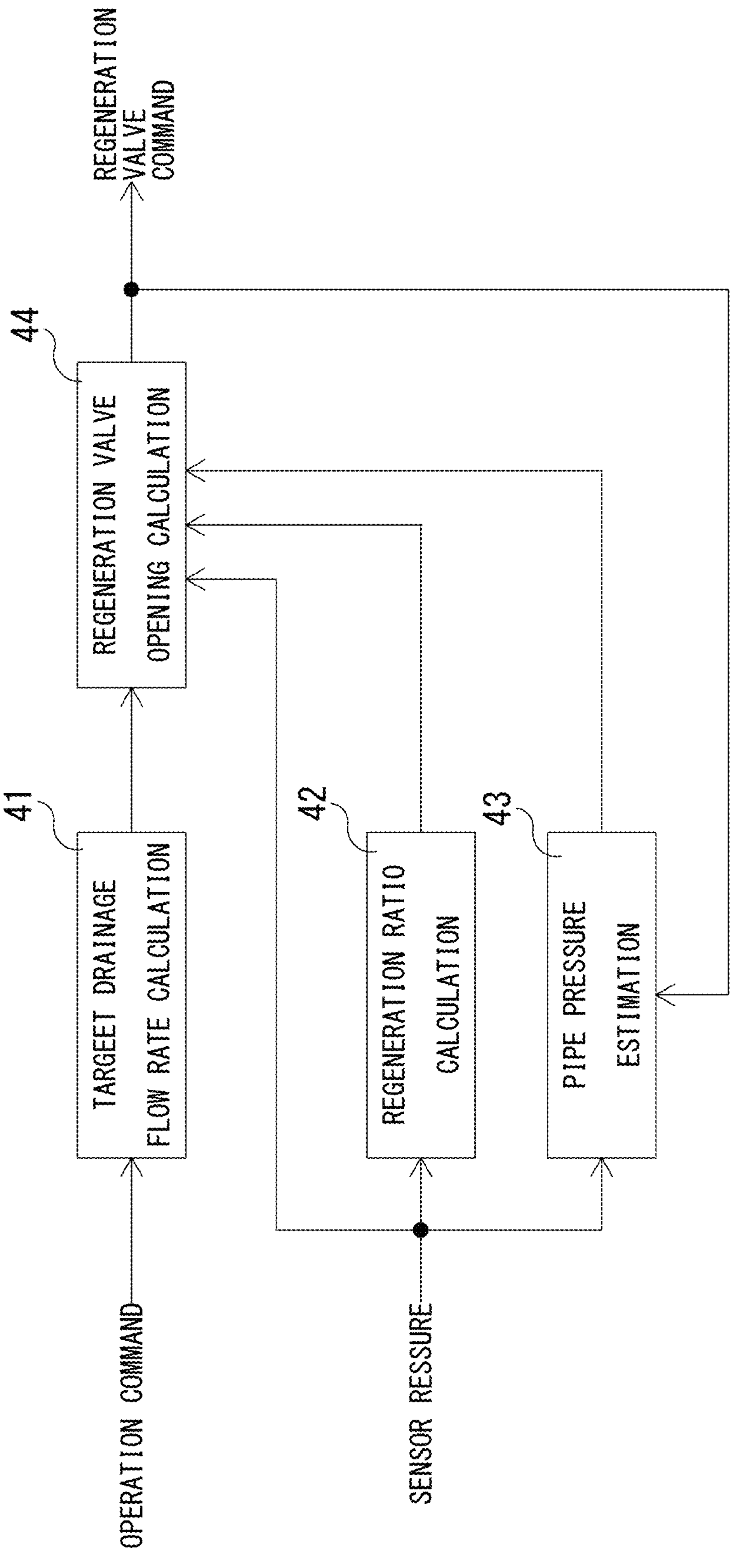
FIG. 2 is a block diagram of a control device included in the hydraulic drive system shown in FIG. 1 that is related to opening control for a regeneration valve.
Figure 3:
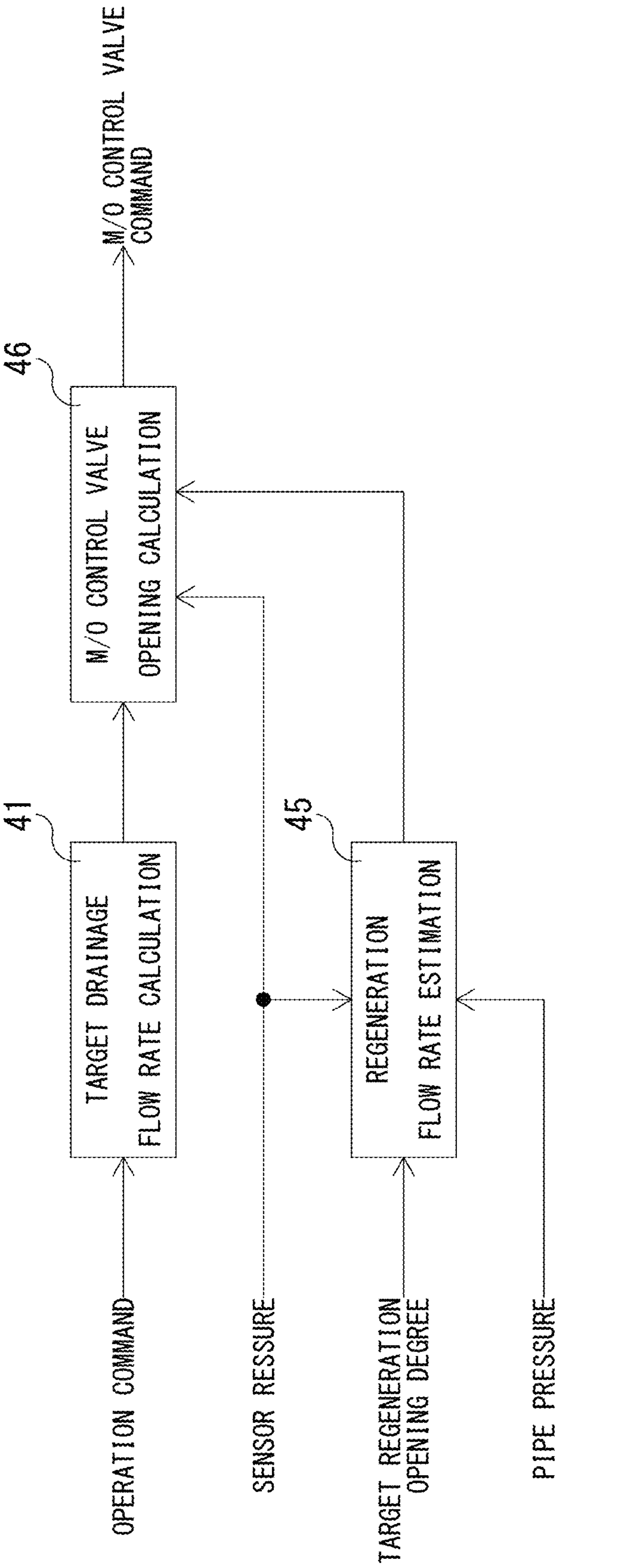
FIG. 3 is a block diagram of a control device included in the hydraulic drive system shown in FIG. 1 that is related to opening control for a meter-out control valve.

The control device 19 is connected to the regeneration valve 14, the three pressure sensors 15 to 17, the four electromagnetic proportional control valves 31L, 31R, 32L, 32R, and the operation device 18. The control device 19 controls the opening of each of the regeneration valve 14 and the meter-out control valve 13. Thus, the control device 19 causes the working fluid to be drained from the hydraulic cylinder 2 at a drainage flow rate corresponding to an operation signal from the operation device 18. More specifically, by controlling the opening of the regeneration valve 14 according to the load state of the hydraulic cylinder 2, the control device 19 causes the working fluid to be regenerated from the rod-end port 2*c* to the head-end port 2*d* via the regeneration valve 14 at the regeneration flow rate. Furthermore, by controlling the opening degree of the meter-out control valve 13, the control device 19 causes the working fluid to be drained from the meter-out control valve 13 into the tank 10 at a meter-out flow rate obtained by subtracting the regeneration flow rate from the drainage flow rate. More specifically, the control device 19 includes a target drainage flow rate calculator 41, a regeneration ratio calculator 42, a pipe pressure estimator 43, and a regeneration valve opening calculator 44, as shown in FIG. 2, in order to control the opening degree of the regeneration valve 14. Furthermore, the control device 19 includes a target drainage flow rate calculator 41, a regeneration flow rate estimator 45, and a meter-in control valve opening calculator (M/O control valve opening calculator) 46, as shown in FIG. 3, in order to adjust the meter-out flow rate according to the regeneration flow rate.

The target drainage flow rate calculator 41 calculates a target drainage flow rate of the working fluid that is drained from the hydraulic cylinder 2 according to the operation command from the operation device 18. In the present embodiment, the target drainage flow rate calculator 41 calculates a target drainage flow rate on the basis of a map indicating the association between operation commands and target drainage flow rates. Note that the target drainage flow rate may be calculated on the basis of a relational expression.

The regeneration ratio calculator 42 calculates a regeneration ratio on the basis of the load state of the hydraulic cylinder 2. The regeneration ratio is the ratio of the regeneration flow rate to the target drainage flow rate of the working fluid that is drained from the hydraulic cylinder 2. In other words, the regeneration ratio is the ratio of the flow rate of the working fluid to be regenerated relative to the target drainage flow rate of the working fluid that is drained from the hydraulic cylinder 2. The load state indicates a load (driving force or braking force) on the hydraulic cylinder 2. The load state is calculated using at least one of the hydraulic pressure at the rod-end port 2*c* (the rod pressure Pcr measured by the first pressure sensor 15) and the hydraulic pressure at the head-end port 2*d* (the head pressure Pch measured by the second pressure sensor 16). Note that the discharge pressure (the discharge pressure measured by the third pressure sensor 17) may be used instead of the hydraulic pressure at the head-end port 2*d*. The regeneration ratio is set according to the rod pressure Pcr measured by the first pressure sensor 15 and the head pressure Pch measured by the second pressure sensor 16. In the present embodiment, the regeneration ratio is set low when the head pressure Pch is high and is set high when the head pressure Pch is low. Note that the regeneration ratio is set according to the load on the hydraulic cylinder 2 that is calculated on the basis of the difference between the rod pressure Pcr and the head pressure Pch. The load on the hydraulic cylinder 2 has a negative value when the rod 2*b* is extended as a result of being pushed by the load. With the settings in the present embodiment, the regeneration ratio is reduced as the absolute value of the load increases in order to extend the rod 2*b*. Note that the relationship between the regeneration ratio and the load state of the hydraulic cylinder 2 is not limited to the aforementioned relationship. When the first and second pressure sensors 15, 16 measure hydraulic pressures, the regeneration ratio calculator 42 calculates a regeneration ratio on the basis of the measurement result.

The pipe pressure estimator 43 estimates a downstream pressure of the regeneration valve 14. Specifically, the pipe pressure estimator 43 estimates the pressure (pipe pressure Ph) of the working fluid flowing through a pipe portion 23*a* located between the regeneration valve 14 and the check valve 20 in the regeneration passage 23. More specifically, pipe pressure estimator 43 estimates the downstream pressure on the basis of the rod pressure Pcr (drainage pressure) measured by the first pressure sensor 15, the head pressure Pch (supply pressure) measured by the second pressure sensor 16, and a target regeneration opening degree. The target regeneration opening degree is the target regeneration opening degree of the regeneration valve 14 calculated by the regeneration valve opening calculator 44, which will be described in detail later. Specifically, the pipe pressure estimator 43 estimates the pipe pressure Ph on the basis of the rod pressure Pcr, the head pressure Pch, the target regeneration opening degree, and the opening degree (predetermined value) of the check valve 20. Note that at the time of estimating the pipe pressure Ph, the head pressure Pch does not necessarily need to be referred to. The pipe pressure Ph can be estimated with improved accuracy when the head pressure Pch is additionally referred to.

The regeneration valve opening calculator 44 calculates a regeneration valve command on the basis of the target drainage flow rate, the regeneration ratio, the head pressure Pch, and the rod pressure Pcr. More specifically, the regeneration valve opening calculator 44 multiplies the target flow rate calculated by the target drainage flow rate calculator 41 by the regeneration ratio calculated by the regeneration ratio calculator 42. Thus, the target regeneration flow rate for the regeneration valve 14 is calculated. The regeneration valve opening calculator 44 calculates the target regeneration opening degree on the basis of the calculated target regeneration flow rate, the pipe pressure Ph, and the rod pressure Pcr measured by the first pressure sensor 15. The target regeneration opening degree is the opening degree of the regeneration valve 14 that is applied in order to cause the working fluid to flow to the head-end port 2*d* at the aforementioned target regeneration flow rate. When the regeneration valve opening calculator 44 calculates the target regeneration opening degree, the regeneration valve opening calculator 44 outputs a regeneration valve command corresponding to the target regeneration opening degree to the regeneration valve 14. Thus, when the pressure at the rod-end port 2*c* is higher than the pressure at the head-end port 2*d*, the working fluid is regenerated from the rod-end port 2*c* to the head-end port 2*d* via the regeneration valve 14 at the target regeneration flow rate.

The regeneration flow rate estimator 45 estimates the regeneration flow rate on the basis of the opening degree of the regeneration valve 14. More specifically, the regeneration flow rate estimator 45 estimates the regeneration flow rate on the basis of the target regeneration opening degree and an upstream-downstream pressure difference of the regeneration valve 14. The upstream-downstream pressure difference of the regeneration valve 14 is calculated by subtracting the pipe pressure Ph from the rod pressure Pcr in the present embodiment. The first pressure sensor 15 measures the rod pressure Pcr. The pipe pressure estimator 43 estimates the pipe pressure Ph. The regeneration valve opening calculator 44 calculates the target regeneration opening degree.

The M/O control valve opening calculator 46 calculates the target meter-out flow rate. More specifically, the M/O control valve opening calculator 46 calculates the target meter-out flow rate by subtracting the regeneration flow rate from the target drainage flow rate. The target drainage flow rate calculator 41 calculates the target drainage flow rate. The regeneration flow rate estimator 45 calculates the regeneration flow rate. The M/O control valve opening calculator 46 calculates a target meter-out opening degree on the basis of the calculated target meter-out flow rate, the rod pressure Pcr measured by the first pressure sensor 15, and a predetermined tank pressure. The target meter-out opening degree is the opening degree of the meter-out control valve 13 that is to be applied in order to drain the working fluid into the tank 10 at the target meter-out flow rate. Note that the target meter-out opening degree may be calculated on the basis of the downstream pressure of the meter-out control valve 13 instead of the tank pressure. The downstream pressure of the meter-out control valve 13 is measured by a pressure sensor not illustrated in the drawings or is estimated by a pressure estimating equation. When the M/O control valve opening calculator 46 calculates the target meter-out opening degree, the M/O control valve opening calculator 46 outputs a meter-out control valve command (M/O control valve command) corresponding to the target meter-out opening degree to the electromagnetic proportional control valves 32L, 32R. For example, in the case of draining the working fluid through the rod-end port 2*c*, the control device 19 outputs a M/O command to the electromagnetic proportional control valve 32L. Thus, the working fluid is drained into the tank 10 via the meter-out control valve 13 at the target meter-out flow rate. In other words, the working fluid can be drained from the hydraulic cylinder 2 at the target drainage flow rate using the regeneration valve 14 and the meter-out control valve 13.

Furthermore, the control device 19 controls the opening degree of the meter-in control valve 12 according to the operation command from the operation device 18. More specifically, the control device 19 calculates, on the basis of the operation command from the operation device 18, a target supply flow rate and a direction in which the working fluid is supplied. Moreover, the control device 19 calculates a target meter-in flow rate by subtracting the aforementioned target regeneration flow rate from the calculated target supply flow rate. The target meter-in flow rate is a flow rate at which the working fluid is to be supplied to the hydraulic cylinder 2 via the meter-in control valve 12. Furthermore, the control device 19 calculates the opening degree of the meter-in control valve 12 on the basis of the target meter-in flow rate and the upstream-downstream pressure difference of the meter-in control valve 12. The control device 19 calculates the upstream-downstream pressure difference of the meter-in control valve 12 on the basis of the hydraulic pressures measured by the third pressure sensor 17 and one of the first and second pressure sensors 15, 16. Subsequently, the control device 19 outputs the meter-in control valve command (M/I control valve command) corresponding to the calculated opening degree to the electromagnetic proportional control valves 31L, 31R. For example, in the case of supplying the working fluid to the head-end port 2*d*, the control device 19 outputs a M/I command to the electromagnetic proportional control valve 31L. Thus, the working fluid is supplied from the meter-in control valve 12 to the hydraulic cylinder 2 at the target meter-in flow rate. The working fluid is supplied to the hydraulic cylinder 2 at the target supply flow rate.

In the hydraulic drive system 1 configured as described above, when the rod 2*b* is extended and a load is applied in the direction of extension, the working fluid can be regenerated from the rod-end port 2*c* to the head-end port 2*d*. The control device 19 controls the opening of each of the meter-in control valve 12, the regeneration valve 14, and the meter-out control valve 13 at the time of regeneration as follows. Specifically, when the operation lever 18*a* is operated, the operation device 18 outputs an operation command corresponding to the amount of operation of the operation lever 18*a* to the control device 19. The control device 19 then outputs the regeneration valve command to the regeneration valve 14. Specifically, when the operation command is output, the target drainage flow rate calculator 41 calculates the target drainage flow rate, the regeneration ratio calculator 42 calculates the regeneration ratio, and the pipe pressure estimator 43 estimates the pipe pressure Ph in the control device 19. Furthermore, in the control device 19, the regeneration valve opening calculator 44 calculates the target regeneration opening degree on the basis of the target drainage flow rate, the regeneration ratio, and the pipe pressure Ph. Subsequently, in the control device 19, the regeneration valve opening calculator 44 outputs the regeneration valve command corresponding to the target regeneration opening degree to the regeneration valve 14. Thus, the working fluid is regenerated from the rod-end port 2*c* to the head-end port 2*d* at the regeneration flow rate corresponding to the load state of the hydraulic cylinder 2.

Furthermore, in the control device 19, the regeneration flow rate estimator 45 estimates the regeneration flow rate in order to control the opening of the meter-out control valve 13. Moreover, in the control device 19, the M/O control valve opening calculator 46 calculates the target meter-out opening degree on the basis of the target drainage flow rate and the regeneration flow rate. Subsequently, in the control device 19, the M/O control valve opening calculator 46 outputs the M/O control valve command corresponding to the target meter-out opening degree to the electromagnetic proportional control valve 32L. Thus, the working fluid can be drained from the rod-end port 2*c* of the hydraulic cylinder 2 into the tank 10 via the meter-out control valve 13 at the target meter-out flow rate. In other words, by combining the target meter-out flow rate and the target regeneration flow rate, it is possible to drain the working fluid from the rod-end port 2*c* at the target drainage flow rate.

Furthermore, in order to control the opening of the meter-in control valve 12, the control device 19 outputs the M/I command corresponding to the operation command and the regeneration flow rate to the electromagnetic proportional control valve 31L. With this, the opening of the meter-in control valve 12 is controlled according to the operation command and the regeneration flow rate. Specifically, the working fluid is supplied from the hydraulic pump 11 to the head-end port 2*d* of the hydraulic cylinder 2 via the meter-in control valve 12 at the target meter-in flow rate. Thus, by combining the target meter-in flow rate and the target regeneration flow rate, it is possible to supply the working fluid to the head-end port 2*d* at the target supply flow rate.

In the hydraulic drive system 1 configured as described above, the working fluid can be accurately drained from the rod-end port 2*c* at the target drainage flow rate corresponding to the operation command while the regeneration is carried out from the rod-end port 2*c* to the head-end port 2*d*. Therefore, the hydraulic cylinder 2 can operate at the speed corresponding to the amount of operation of the operation lever 18*a* of the operation device 18. This makes it possible to improve the operability of the hydraulic cylinder 2.

Furthermore, the hydraulic drive system 1 according to the present embodiment can independently control the flow rate of the working fluid flowing through each of the meter-in control valve 12, the meter-out control valve 13, and the regeneration valve 14. Therefore, the meter-out flow rate can be adjusted in line with variations in the regeneration flow rate. Thus, it is possible to reduce variations in the drainage flow rate of the working fluid flowing from the hydraulic cylinder 2, and it is possible to reduce the impact of variations in the regeneration flow rate on the responsiveness of the hydraulic actuator.

Furthermore, in the hydraulic system 1, the meter-out control valve 13 is connected to the hydraulic actuator in parallel with the regeneration valve 14. Therefore, the working fluid that is drained into the tank 10 is drained from the hydraulic cylinder 2 into the tank 10 without passing through the regeneration valve 14. Thus, it is possible to reduce the pressure loss in the working fluid that is drained into the tank 10. This makes it possible to improve the fuel consumption of the drive source (engine E).

Furthermore, by controlling the openings of the regeneration valve 14 and the meter-out control valve 13 so that the regeneration flow rate and the meter-out flow rate are linked to each other, the hydraulic drive system 1 can maintain, at the flow rate corresponding to the operation signal, the drainage flow rate of the working fluid flowing from the hydraulic cylinder 2. This enables stable operability while maintaining the responsiveness of the hydraulic cylinder 2 as a result of the regeneration flow rate being adjusted to the optimal flow rate.

Furthermore, in the hydraulic drive system 1, the control device 19 calculates the meter-out flow rate by subtracting the target regeneration flow rate from the target drainage flow rate. Therefore, the meter-out flow rate increases or decreases according to variations in the regeneration flow rate, meaning that the regeneration flow rate and the meter-out flow rate can be kept from falling short, for example. Thus, an increase in the discharge pressure of the hydraulic pump 11 and the occurrence of cavitation can be minimized.

Furthermore, in the hydraulic drive system 1, the regeneration valve 14 and the meter-out control valve 13 are arranged in parallel, and thus the pipe pressure Ph can be accurately estimated. This makes it possible to not only improve the accuracy of estimating the regeneration flow rate, but also stabilize the control. Moreover, when the supply pressure measured in order to estimate the pipe pressure Ph is referred to, the pipe pressure Ph can be estimated with improved accuracy. This makes it possible to not only further improve the accuracy of estimating the regeneration flow rate, but also further stabilize the control.

Furthermore, in the hydraulic drive system 1, by using the regeneration ratio, it is possible to convert the regeneration flow rate according to the load on the hydraulic actuator. Thus, an increase in the discharge pressure of the hydraulic pump 11 and the occurrence of cavitation can be minimized.

Other Embodiments

In the hydraulic drive system 1 according to the present embodiment, the hydraulic cylinder 2 is exemplified as the hydraulic actuator to be driven; however, the hydraulic actuator may be a hydraulic motor. Furthermore, regarding the type of the hydraulic cylinder 2, the hydraulic cylinder 2 is not limited to a single-rod double-acting cylinder and may be a double-rod cylinder or a single-acting cylinder. Furthermore, the meter-in control valve 12, the meter-out control valve 13, and the regeneration valve 14 are not limited to having the configurations described above. Specifically, it is sufficient that each of the meter-in control valve 12, the meter-out control valve 13, and the regeneration valve 14 have a controllable opening.

Furthermore, in the hydraulic drive system 1, the spools 12*a*, 13*a* of the meter-in control valve 12 and the meter-out control valve 13 may each be driven using an electric motor or the like. Moreover, in the hydraulic drive system 1, the number of hydraulic actuators connected to the hydraulic pump 11 may be two or more. In this case, the operation device 18 includes a plurality of operation levers 18*a* that are in one-to-one correspondence with hydraulic actuators. When at least two operation levers 18*a* included in the plurality of operation levers 18*a* are operated, the control device 19 modifies the target drainage flow rate and the target supply flow rate according to the number of operation levers 18*a* being operated and the amount of operation of each of the operation levers 18*a* being operated.

Furthermore, in the hydraulic drive system 1 according to the present embodiment, the regeneration ratio varies according to the load state of the hydraulic cylinder 2, but the regeneration ratio may be a constant value. Alternatively, regarding the regeneration ratio, the regeneration may switch between ON and OFF according to the load state of the hydraulic cylinder 2. Furthermore, in the hydraulic drive system 1 according to the present embodiment, the control device 19 does not necessarily need to control the opening of each of the meter-in control valve 12, the meter-out control valve 13, and the regeneration valve 14 in the above-described manner.

Figure 4:
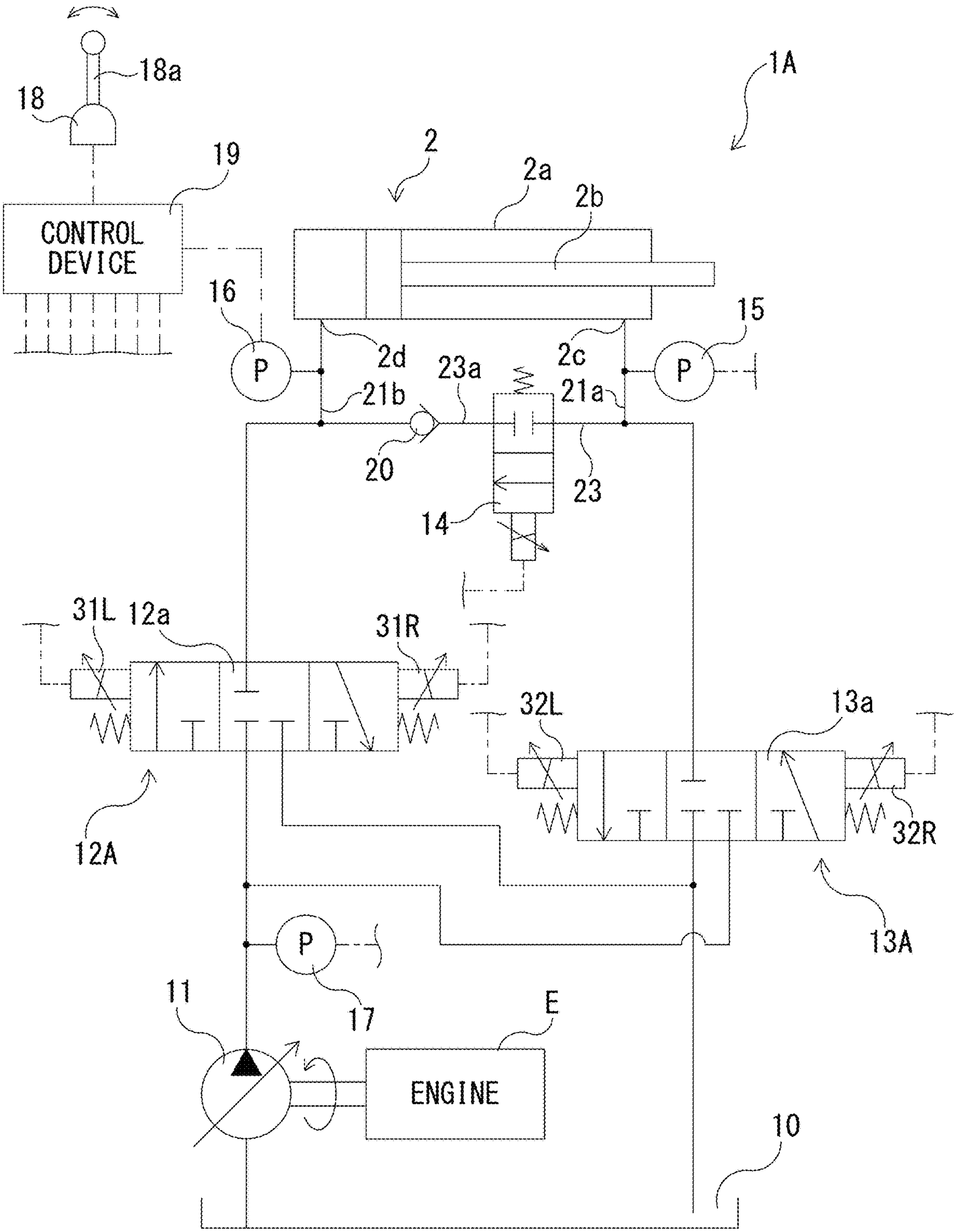
FIG. 4 is a hydraulic circuit diagram showing a hydraulic drive system according to another embodiment of the present invention.

Furthermore, a hydraulic drive system 1A according to another embodiment may be configured as illustrated in FIG. 4. Specifically, the hydraulic drive system 1A includes a head-end control valve 12A and a rod-end control valve 13A. The head-end control valve 12A has a head-end port 2*d* connected to one of the hydraulic pump 11 and the tank 10. The head-end control valve 12A controls the meter-in flow rate and the meter-out flow rate of the working fluid flowing to and from the head-end port 2*d*. Similarly, the rod-end control valve 13A has a rod-end port 2*c* connected to one of the hydraulic pump 11 and the tank 10. The rod-end control valve 13A controls the meter-in flow rate and the meter-out flow rate of the working fluid flowing to and from the rod-end port 2*c*. Therefore, in the hydraulic drive system 1A, for example, at the time of extending the rod 2*b*, the head-end control valve 12A functions as a meter-in control valve, and the rod-end control valve 13A functions as a meter-out control valve. The hydraulic drive system 1A has substantially the same configuration as does the hydraulic drive system 1 according to the present embodiment.

The hydraulic drive system 1A configured as described above can also independently control the flow rate of the working fluid flowing through each of the head-end control valve 12A, the rod-end control valve 13A, and the regeneration valve 14. Therefore, the meter-out flow rate can be adjusted in line with variations in the regeneration flow rate. Thus, it is possible to reduce variations in the drainage flow rate of the working fluid flowing from the hydraulic cylinder 2, and it is possible to reduce the impact of variations in the regeneration flow rate on the responsiveness of the hydraulic actuator. The hydraulic drive system 1A produces substantially the same advantageous effects as does the hydraulic drive system 1 according to the present embodiment.

From the foregoing description, many modifications and other embodiments of the present invention would be obvious to a person having ordinary skill in the art. Therefore, the foregoing description should be interpreted only as an example and is provided for the purpose of teaching the best mode for carrying out the present invention to a person having ordinary skill in the art. Substantial changes in details of the structures and/or functions of the present invention are possible within the spirit of the present invention.

REFERENCE CHARACTERS LIST

1 hydraulic drive system
10 tank
11 hydraulic pump
12 meter-in control valve
12A rod-end control valve
13 meter-out control valve
13A head-end control valve
14 regeneration valve
15 first pressure sensor
16 second pressure sensor
18 operation device
18*a* operation lever (operation tool)
19 control device

The invention claimed is:

1. A hydraulic drive system comprising:

a hydraulic pump that supplies a working fluid to a hydraulic actuator including two ports;

a first control valve that is a spool valve connected to one of the two ports, and controls a meter-in flow rate of the working fluid being supplied from the hydraulic pump to the one of the two ports and a meter-out flow rate of the working fluid being drained from the one of the two ports into a tank;

a regeneration valve that supplies, to the hydraulic actuator, the working fluid drained from the hydraulic actuator;

a second control valve that is a spool valve connected to the hydraulic actuator in parallel with the regeneration valve and connected to the other of the two ports, and controls a meter-in flow rate of the working fluid being supplied from the hydraulic pump to the other of the two ports and a meter-out flow rate of the working fluid being drained from the other of the two ports into the tank;

an operation device that outputs an operation signal corresponding to an amount of operation of an operation tool; and a control device that controls an opening of each of the regeneration valve and the second control valve to drain the working fluid from the hydraulic actuator at a flow rate corresponding to the operation signal from the operation device, wherein:

the control device estimates a regeneration flow rate on the basis of an opening degree of the regeneration valve and controls the opening of the second control valve to cause the working fluid to flow into the tank at a meter-out flow rate which is a difference between a drainage flow rate of the working fluid being drained from the hydraulic actuator according to the operation signal from the operation device and the estimated regeneration flow rate.

2. The hydraulic drive system according to claim 1, further comprising:

a first pressure sensor that measures a drainage pressure which is a pressure of the working fluid being drained from the hydraulic actuator, wherein:

the control device estimates a regeneration flow rate on the basis of a downstream pressure of the regeneration valve and the drainage pressure measured by the first pressure sensor; and the downstream pressure of the regeneration valve is estimated on the basis of the drainage pressure measured by the first pressure sensor and the opening degree of the regeneration valve.

3. The hydraulic drive system according to claim 2, further comprising:

a second pressure sensor that measures a supply pressure which is a pressure of the working fluid being supplied to the hydraulic actuator, wherein:

the control device estimates the downstream pressure of the regeneration valve on the basis of the drainage pressure measured by the first pressure sensor, the supply pressure measured by the second pressure sensor, and the opening degree of the regeneration valve.

4. The hydraulic drive system according to claim 1, wherein:

the control device sets, according to a load state of the hydraulic actuator, a regeneration ratio which is a ratio of the regeneration flow rate to the drainage flow rate of the working fluid being drained from the hydraulic actuator, and controls the opening of the regeneration valve according to the regeneration ratio.

5. A hydraulic drive system comprising:

a hydraulic pump that supplies a working fluid to a hydraulic actuator including two ports;

a first control valve that is a spool valve connected to one of the two ports, and controls a meter-in flow rate of the working fluid being supplied from the hydraulic pump to the one of the two ports and a meter-out flow rate of the working fluid being drained from the one of the two ports into a tank;

a regeneration valve that supplies, to the hydraulic actuator, the working fluid drained from the hydraulic actuator;

a second control valve that is a spool valve connected to the hydraulic actuator in parallel with the regeneration valve and connected to the other of the two ports, and controls a meter-in flow rate of the working fluid being supplied from the hydraulic pump to the other of the two ports and a meter-out flow rate of the working fluid being drained from the other of the two ports into the tank;

a first pressure sensor that measures a drainage pressure which is a pressure of the working fluid being drained from the hydraulic actuator;

an operation device that outputs an operation signal corresponding to an amount of operation of an operation tool; and a control device that controls an opening of each of the regeneration valve and the second control valve to drain the working fluid from the hydraulic actuator at a flow rate corresponding to the operation signal from the operation device, wherein:

the control device estimates a regeneration flow rate on the basis of a downstream pressure of the regeneration valve and the drainage pressure measured by the first pressure sensor; and the downstream pressure of the regeneration valve is estimated on the basis of the drainage pressure measured by the first pressure sensor and an opening degree of the regeneration valve.

6. A hydraulic drive system comprising:

a hydraulic pump that supplies a working fluid to a hydraulic actuator including two ports;

a first control valve that is a spool valve connected to one of the two ports, and controls a meter-in flow rate of the working fluid being supplied from the hydraulic pump to the one of the two ports and a meter-out flow rate of the working fluid being drained from the one of the two ports into a tank;

a regeneration valve that supplies, to the hydraulic actuator, the working fluid drained from the hydraulic actuator;

a second control valve that is a spool valve connected to the hydraulic actuator in parallel with the regeneration valve and connected to the other of the two ports, and controls a meter-in flow rate of the working fluid being supplied from the hydraulic pump to the other of the two ports and a meter-out flow rate of the working fluid being drained from the other of the two ports into the tank;

an operation device that outputs an operation signal corresponding to an amount of operation of an operation tool; and a control device that controls an opening of each of the regeneration valve and the second control valve to drain the working fluid from the hydraulic actuator at a flow rate corresponding to the operation signal from the operation device, wherein:

the control device sets, according to a load state of the hydraulic actuator, a regeneration ratio which is a ratio of a regeneration flow rate to a drainage flow rate of the working fluid being drained from the hydraulic actuator, and controls the opening of the regeneration valve according to the regeneration ratio.

* * * * *